(12) United States Patent
Bairavasundaram et al.

(10) Patent No.: US 9,274,954 B1
(45) Date of Patent: Mar. 1, 2016

(54) CACHING DATA USING MULTIPLE CACHE DEVICES

(71) Applicant: NetApp, Inc., Sunnyvale, CA (US)

(72) Inventors: Lakshmi Narayanan Bairavasundaram, San Jose, CA (US); Gokul Soundararajan, Sunnyvale, CA (US); Mark Walter Storer, Walnut Creek, CA (US)

(73) Assignee: NetApp, Inc., Sunnyvale, CA (US)

( * ) Notice: Subject to any disclaimer, the term of this patent is extended or adjusted under 35 U.S.C. 154(b) by 172 days.

(21) Appl. No.: 13/718,700

(22) Filed: Dec. 18, 2012

(51) Int. Cl.
*G06F 12/08* (2006.01)

(52) U.S. Cl.
CPC ........ *G06F 12/0806* (2013.01); *G06F 12/0888* (2013.01); *G06F 12/0815* (2013.01)

(58) Field of Classification Search
CPC .......................... G06F 12/0815; G06F 12/0811
USPC .................................................. 711/119–120
See application file for complete search history.

(56) References Cited

U.S. PATENT DOCUMENTS

| | | | |
|---|---|---|---|
| 5,701,516 A | 12/1997 | Cheng et al. | |
| 6,055,572 A * | 4/2000 | Saksena | ........................ 709/224 |
| 7,519,628 B1 | 4/2009 | Leverett | |
| 7,647,417 B1 | 1/2010 | Taneja | |
| 7,698,334 B2 | 4/2010 | Kazar et al. | |
| 7,827,192 B2 | 11/2010 | Batterywala | |
| 8,041,748 B2 | 10/2011 | Taneja | |
| 8,055,702 B2 | 11/2011 | Lango et al. | |
| 8,099,766 B1 | 1/2012 | Corbett | |
| 8,161,236 B1 | 4/2012 | Noveck et al. | |
| 8,171,227 B1 | 5/2012 | Goldschmidt et al. | |
| 8,321,645 B2 | 11/2012 | Rabii et al. | |
| 8,549,222 B1 | 10/2013 | Kleiman et al. | |
| 8,621,154 B1 | 12/2013 | Goldschmidt et al. | |
| 8,825,789 B2 | 9/2014 | Muntz | |
| 9,026,736 B1 | 5/2015 | Venkat et al. | |
| 2005/0172080 A1* | 8/2005 | Miyauchi | ..................... 711/136 |
| 2008/0235457 A1* | 9/2008 | Hasenplaugh et al. | ....... 711/130 |
| 2010/0217938 A1* | 8/2010 | Schneider | ..................... 711/141 |
| 2011/0010489 A1* | 1/2011 | Yeh | ............................... 711/103 |

(Continued)

OTHER PUBLICATIONS

U.S. Appl. No. 13/718,452, filed Dec. 18, 2012 by Lakshmi Narayanan Bairavasundaram et al. for System and Method for an Efficient Cache Warm-Up, 89 pages.

(Continued)

*Primary Examiner* — Jared Rutz
*Assistant Examiner* — Stephanie Wu
(74) *Attorney, Agent, or Firm* — Cesari and McKenna, LLP

(57) ABSTRACT

System and method for processing cache metadata from a plurality of cache devices. One or more storage systems may store data blocks to a set of storage devices, each storage system hosting and operating one or more cache devices for caching data blocks of the storage devices. Each cache device may host and implement an agent engine that collects and stores cache metadata for the cache device, the cache metadata describing caching operations of the cache device. A monitor engine receives and aggregates "raw cache metadata" from each of a plurality of cache devices and processes the raw cache metadata to produce processed cache metadata comprising normalized cache metadata (based on activity rate of a cache device), weighted cache metadata, or normalized weighted cache metadata. The processed cache metadata is used by a cache prediction engine to select data blocks for caching to one or more of the cache devices.

21 Claims, 10 Drawing Sheets

(56) References Cited

U.S. PATENT DOCUMENTS

| | | |
|---|---|---|
| 2013/0086198 A1* | 4/2013 | Claman et al. ............... 709/213 |
| 2014/0156777 A1 | 6/2014 | Subbiah et al. |
| 2014/0237184 A1 | 8/2014 | Kazar et al. |

OTHER PUBLICATIONS

U.S. Appl. No. 13/718,578, filed Dec. 18, 2012 by Lakshmi Narayanan Bairavasundaram et al. for System and Method for an Efficient Cache Restart, 92 pages.

* cited by examiner

| Block ID | Normalized Access Count |
|---|---|
| A | 0.4 |
| B | 0.3 |
| C | 0.5 |
| D | 0.02 |
| E | 0.07 |
| F | 0.03 |
| G | 0.09 |

| Storage System ID | Weight Value |
|---|---|
| 1 | 0.8 |
| 2 | 1.0 |
| 3 | 0.5 |
| 4 | 0.2 |
| 5 | 0.7 |

| Cache 1 Total: 500 Weight: 0.8 | |
|---|---|
| Block ID | Weighted Access Count |
| A | 80 |
| B | 120 |
| D | 8.8 |
| F | 10.4 |
| H | 18.4 |
| ... | |

| Cache 2 Total: 150 Weight: 1.0 | |
|---|---|
| Block ID | Weighted Access Count |
| A | 30 |
| C | 75 |
| E | 10 |
| G | 14 |
| K | 11 |
| ... | |

| Cache 3 Total: 324 Weight: 0.5 | |
|---|---|
| Block ID | Weighted Access Count |
| L | 11 |
| M | 6 |
| N | 5 |
| R | 5.5 |
| S | 5 |
| ... | |

FIG.9

| Block ID | Normalized Weighted Access Count |
|---|---|
| A | 0.36 |
| B | 0.24 |
| C | 0.5 |
| D | 0.02 |
| E | 0.07 |
| F | 0.02 |
| G | 0.09 |

CACHING DATA USING MULTIPLE CACHE DEVICES

FIELD

Embodiments of the present disclosure relate to storage systems, and in particular, to caching data using multiple cache devices.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. For example, the storage devices may comprise disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a cluster architecture configured to service many servers. The cluster architecture may provide a shared storage pool comprising one or more aggregates. Each aggregate may comprise a set of one or more storage devices (e.g., disks). Each aggregate may store one or more storage objects, such as one or more volumes. The aggregates may be distributed across a plurality of storage systems of the cluster architecture. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system may receive read requests for data stored on a storage device (e.g., a large capacity storage device such as a disk). In response, the storage system may transmit data from a storage device to a client associated with the read request. However, such read requests may take a significant time to respond to and cause performance limitations of the storage system. For example, retrieving and transmitting requested data from a storage device in response to a read request may produce a slow response time.

For improved response to received read or write requests, the storage system may temporarily store/cache particular selected data in a smaller cache device for faster access. The cache memory may comprise a memory device having lower random read-latency than a typical storage device and may thus still provide faster data access than a typical storage device. However, the cache memory may comprise a memory device that is more costly (for a given amount of data storage) than a typical large capacity storage device. Since the storage size of the cache device is relatively small, data stored in the cache device is chosen selectively by cache prediction algorithms (sometimes referred to as cache warming algorithms). A cache prediction algorithm may use cache metadata describing caching operations of a cache device to select which data to store to the cache device. In essence, the cache prediction algorithm is predicting that the selected data will be requested and accessed by a client relatively soon, thus the selected data is pre-loaded to the cache device.

As described above, one or more storage systems may store data to a shared storage pool (comprising a set of storage devices) for providing storage services to one or more servers and. One or more cache devices may reside and operate on each storage system. Conventional methods, however, do not provide an efficient and accurate method for processing cache metadata from multiple cache devices. Without improved methods for processing cache metadata from multiple cache devices, cache prediction algorithms using the cache metadata may not select desirable data for storage to the cache devices, thus increasing response times to received access requests.

SUMMARY

The embodiments described herein provide a system and method for processing cache metadata from a plurality of cache devices. One or more storage systems may store data blocks to a set of storage devices, each storage system hosting and operating one or more cache devices for caching data blocks of the storage devices. Each cache device may host and implement/execute an agent engine that collects and stores cache metadata for the cache device, the cache metadata describing caching operations and the caching of data blocks by the cache device. In some embodiments, one of the storage systems hosts and executes a monitor engine that receives and aggregates "raw cache metadata" from each of a plurality of cache devices. In other embodiments, a server or dedicated computer system hosts and executes the monitor engine. The monitor engine processes the raw cache metadata in accordance with embodiments described herein to produce "processed cache metadata." The processed cache metadata is used by a cache prediction engine to select data blocks to be pre-loaded and stored to one or more of the cache devices (sometimes referred to herein as "cache warming"). Using the processed cache metadata, the cache prediction engine may make better informed determinations and select more desirable data blocks than if using raw cache metadata to select one or more data blocks for caching.

In some embodiments, there are three stages/steps for processing cache metadata. In a first stage, the agent engine of each cache device collects and stores cache metadata describing the caching operations of the cache device. In a second stage, the agent engine of each cache device transmits/sends the collected raw cache metadata to the monitor engine. In a third state, the monitor engine aggregates and processes the raw cache metadata to produce processed cache metadata that is used by the cache prediction engine to select one or more data blocks for caching.

In the first stage, the monitor engine may determine and send, to the agent engine of each of the plurality of cache devices, at least one parameter for collecting cache metadata, whereby the agent engine of the cache device collects cache metadata in accordance with the at least one parameter. The at least one parameter may comprise any variety of parameters relating to collection of cache metadata and may specify, for example, the type of cache metadata to collect and the manner or method in which to collect it. Examples of cache measurements specified by the at least one parameter include total number of cache accesses, list of most popular data blocks and number of accesses, I/O rate, support threshold, sample time, error rate, etc. In other embodiments, other parameters are used. In some embodiments, the at least one parameter may be determined based, at least in part, on the number of cache devices in the plurality of cache devices. For example, the at least one parameter may comprise a cache device maximum error rate for the cache metadata, wherein the maximum error rate is determined by the monitor engine based on an aggregated maximum error rate and the number of cache devices in the plurality of cache devices. In addition, the monitor engine may determine and send, to each agent engine, a modified parameter of the at least one parameter if a cache device is added or removed from the plurality of cache devices. In this manner, the monitor engine may control and direct the agent engines in the collection of cache metadata by specifying parameters for which cache metadata to collect and how to collect it.

In the second stage, the agent engine of each cache device transmits/sends the collected raw cache metadata to the monitor engine. A plurality of storage systems may host a plurality of cache devices, each storage system connected through a network to the storage system or server that hosts the monitor engine. As such, the collected raw cache metadata of each cache device may be transmitted to the monitor engine via the network. If a cache device is hosted on the same storage system or server that hosts the monitor engine, the collected raw cache metadata of the cache device may be transmitted to the monitor engine via an internal bus. The second stage may be initiated at regular predetermined time intervals. In some embodiments, the cache metadata collected by each cache device since the last time the second stage was initiated is sent to the monitor engine. As such, the cache metadata for a cache device that is received by the monitor engine comprises the cache metadata collected by the cache device during a predetermined time period (referred to as the "collecting time period"). In some embodiments, the collecting time period spans from the last point in time the second stage was initiated to a current point in time when the second stage is currently initiated. In other embodiments, the collecting time period may be specified by a sample time parameter.

In the third state, the monitor engine receives, aggregates, and processes the raw cache metadata to produce processed cache metadata. In some embodiments, the monitor engine does so by normalizing/standardizing the raw cache metadata from each cache device based on an activity rate of the cache device. The activity rate of a cache device indicates a level of access activity for the cache device. In some embodiments, the activity rate of a cache device is indicated by a total number of cache accesses for the cache device during a predetermined time period, such as the collecting time period. The total number of cache accesses may comprise, for example, a total number of read and write accesses, a total number of read accesses only, or a total number of write accesses only for the cache device during the predetermined time period. In these embodiments, the cache metadata from each cache device may specify an individual number of block accesses for at least one cached data block and a total number of cache accesses for the data blocks cached by the cache device during the predetermined time period. In some embodiments, normalizing the cache metadata of a cache device may comprise, for at least one cached data block, dividing the individual number of block accesses for the cached data block by the total number of cache accesses for the cache device.

In other embodiments, the activity rate of a cache device may be indicated by other cache metadata which is used to normalize the cache metadata. The activity rate or total number of cache accesses of a cache device may be derived by such other cache metadata and used to normalize the cache metadata. For example, the activity rate may be indicated by the I/O rate of the cache device and used to normalize the cache metadata, or the total number of cache accesses may be derived from the I/O rate and used to normalize the cache metadata. As such, in other embodiments, any parameter or measurement in the cache metadata received from a cache device that indicates or relates to the activity rate of the cache device may be used to normalize the cache metadata.

Generally a cache prediction engine may select data blocks for caching based on the "popularity" of the data block, which may be indicated by raw cache metadata comprising the number of accesses for multiple data blocks for a predetermined time period. However, relying only on the raw number of accesses for the data blocks may produce skewed results when the cache prediction engine uses cache metadata from different cache devices having different levels of activity. For example, if there is a first cache device that is much more active than a second cache device, the number of block accesses for the data blocks cached by the first cache device will generally be much higher than the number of block accesses for the data blocks cached by the second cache device by the mere fact that the first cache device is much more active. As such, the cache metadata from the first cache device will skew and dominate the number of block accesses for the cached data blocks. By normalizing the cache metadata from each cache device based on an activity rate of the cache device, the cache metadata from a highly active cache device will not skew the cache metadata for particular cached data blocks and a more accurate view of which data blocks are actually the most popular can be achieved.

For example, assume the first cache device had a total number of 500 cache accesses, whereby data block A had 100 read accesses and data block B had 150 read accesses during the predetermined time period. Also, assume the second cache device had a total number of 150 cache accesses, whereby data block A had 30 read accesses and data block C had 75 read accesses during the predetermined time period. If the cache metadata is not normalized for the two cache devices, then it would be determined that data block B is most popular with a total of 150 block accesses, followed by data block A with a total of 130 block accesses, and then lastly data block C with a total of 75 block accesses across the two cache devices. A cache prediction engine using this raw cache metadata to select data blocks may then likely choose data block B for cache warming.

Normalizing the cache metadata of the first cache device, however, may comprise dividing the 100 read accesses for data block A and the 150 read accesses for data block B by the total number of 500 cache accesses for the first cache device to produce a normalized value of 0.2 (100/500) for data block A and a normalized value of 0.3 (150/500) for data block B. Normalizing the cache metadata of the second cache device may comprise dividing the 30 read accesses for data block A and the 75 read accesses for data block C by the total number of 150 cache accesses for the second cache device to produce a normalized value of 0.2 (30/150) for data block A and a normalized value of 0.5 (75/150) for data block C. For multiple cache devices, the normalized cache metadata for the cache devices can then be combined. For the two cache devices, the combined normalized cache metadata for the number of block accesses for data block A is 0.4 (0.2+0.2), for data block B is 0.3, and for data block C is 0.5. As such, the normalized cache metadata indicates that block C is the most popular, followed by block A, then by block B. A cache prediction engine using this normalized cache metadata to select data blocks may then likely choose data block C for cache warming.

As described above, in the third state, the monitor engine processes the raw cache metadata to produce processed cache metadata comprising normalized cache metadata. In other embodiments, the monitor engine processes the raw cache metadata to produce processed cache metadata comprising weighted cache metadata. In these embodiments, each storage system in a plurality of storage systems is assigned and associated with a weight value. For example, the weight value of a storage system may indicate a level of importance of the storage system relative to the other storage systems. For example, a particular storage system may be typically accessed by high priority users (such as administrators, users paying a fee, etc.). Such a storage system may be assigned a higher weight value than a storage system that is not typically accessed by high priority users. As another example, the weight value of a storage system may indicate a desired performance level of the storage system relative to the other storage systems. For example, a particular storage system may have a higher service level objective (SLO) relative to other storage systems, and thus is expected to perform at a higher level than other storage systems. As such, a storage system expected to perform at a higher level may be assigned a higher weight value than a storage system that is expected to perform at a lower level.

In these embodiments, the weight value assigned for a storage system is also the weight value assigned for each cache device that is hosted on the storage system. In these embodiments, each storage system in a plurality of storage systems is assigned and associated with a unique storage system identifier (ID). The cache metadata of each cache device may include the storage system ID of the storage system that hosts the cache device. Upon receiving the cache metadata from a cache device, the monitor engine may access a weight mapping table that maps storage system IDs to their corresponding weight values.

After determining the weight value for a cache device using the weight mapping table, the monitor engine may then apply the weight value to the raw cache metadata for the cache device to produce weighted cache metadata. In further embodiments, the monitor engine may normalize the weighted cache metadata for the cache device to produce normalized weighted cache metadata. As such, depending on the implementation, the monitor engine may normalize the raw cache metadata to produce normalized cache metadata, weight the raw cache metadata to produce weighted cache metadata, or normalize and weight the raw cache metadata to produce normalized weighted cache metadata.

As described above, in the third stage, the monitor engine produces processed cache metadata from the raw cache metadata received and aggregated from a plurality of cache devices. The processed cache metadata is then used by a cache prediction engine to select data blocks to be pre-loaded and stored to one or more of the cache devices (cache warming). The cache prediction engine may implement any cache prediction algorithm known in the art, Bélády's algorithm, Least Recently Used (LRU) algorithm, Most Recently Used (MRU) algorithm, algorithm selecting the K most popular data blocks, algorithm selecting the K most recently used data blocks, etc. In other embodiments, any other cache prediction algorithm known in the art may be used. The cache prediction engine may be part of the monitor engine, or be a separate external component that communicates with the monitor engine. Using the processed cache metadata, the cache prediction engine may select more desirable data blocks than if using raw cache metadata. As such, the cache prediction engine selects one or more data blocks for caching in one or more cache devices based, at least in part, on the processed cache metadata of a plurality of cache devices. This processed cache metadata may comprise normalized cache metadata, weighted cache metadata, or normalized weighted cache metadata depending on the implementation. The cache prediction engine may send identifiers for one or more selected data blocks to the monitor engine, which in turn may send identifiers for the one or more selected data blocks to one or more cache devices indicating which data blocks to pre-load and store to the cache device. In some embodiments, the identifiers for the selected data blocks are sent to all the cache devices so that all the cache devices cache the selected data blocks. In other embodiments, the identifiers for the selected data blocks are only sent to some of the cache devices so that only some of the cache devices cache the selected data blocks.

BRIEF DESCRIPTION OF THE DRAWINGS

FIG. 7 shows a conceptual diagram of exemplary processed cache metadata comprising normalized cache metadata produced by the monitor engine using the aggregated raw cache metadata of FIG. 6.

FIG. 8 shows a conceptual diagram of an exemplary weight mapping data structure used in some embodiments.

FIG. 9 shows a conceptual diagram of exemplary processed cache metadata comprising weighted cache metadata produced by the monitor engine using the aggregated raw cache metadata of FIG. 6.

FIG. 10 shows a conceptual diagram of exemplary processed cache metadata comprising normalized weighted cache metadata produced by the monitor engine using the weighted cache metadata of FIG. 9.

DETAILED DESCRIPTION

Figure 1:
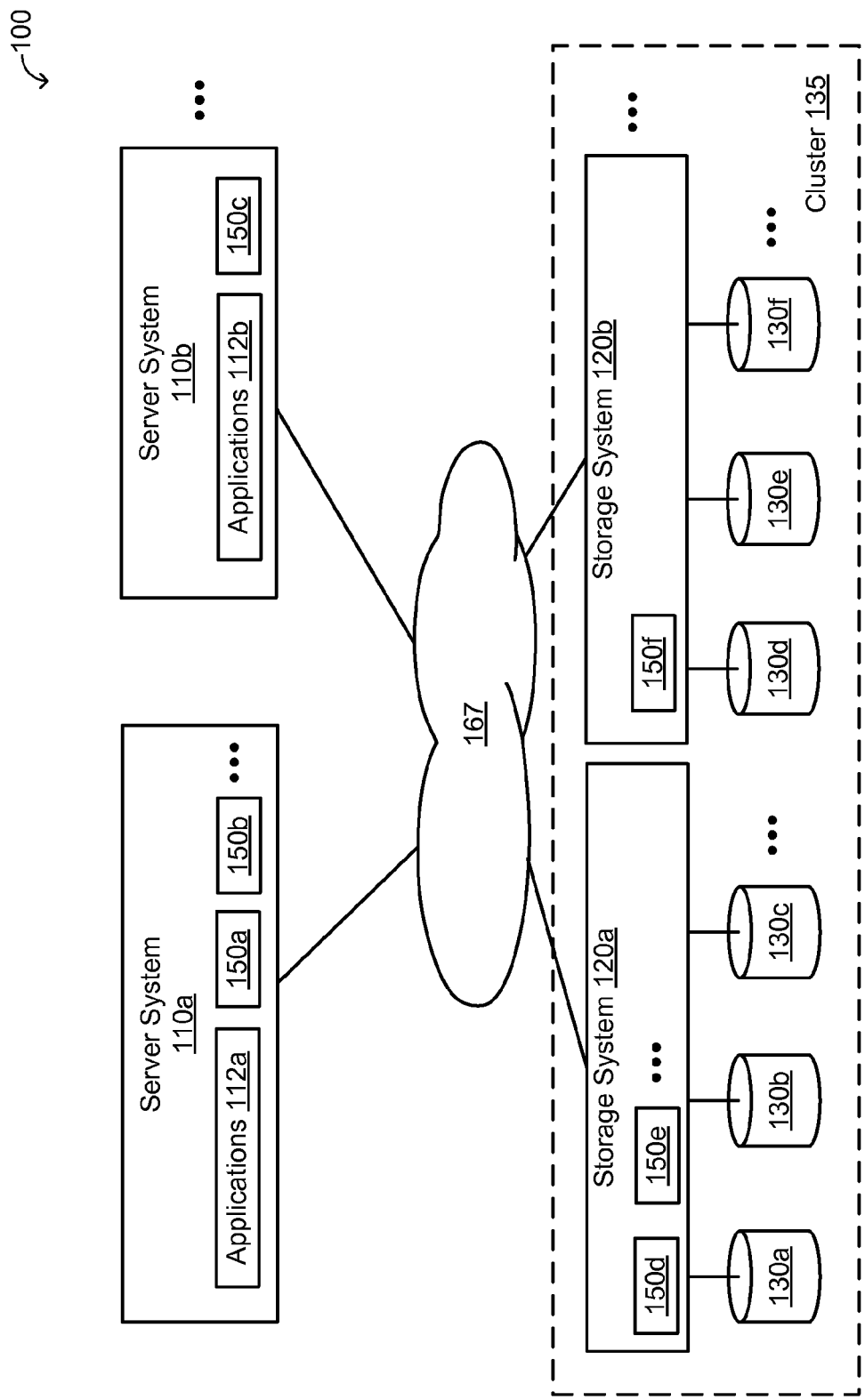
FIG. 1 is a schematic diagram of an exemplary storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into four sections. Section I contains terms used herein. Section II describes a storage system environment in which some embodiments operate. Section III describes first and second stages for collecting and transmitting raw cache metadata. Section IV describes a third stage for aggregating and producing processed cache metadata.

I. Terms

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Storage device: As used herein, a storage device may refer to a non-volatile storage device for computer data storage of client data. In some embodiments, a storage device may have a larger storage capacity than a cache device and a slower access or response time than a cache device. A storage device may comprise a writable storage device media, such as disk device, video tape, optical, DVD, magnetic tape, and any other similar media adapted to store computer data.

Cache device: As used herein, a cache device may refer to a memory device for computer data storage for caching of client data. In some embodiments, a cache device may have a smaller storage capacity than a storage device and a faster access or response time than a storage device. A cache device may comprise volatile or non-volatile memory. For volatile cache devices, the stored data is lost if the power to the cache device is removed. For example, a volatile cache device may store data, but if the volatile cache device loses power, then the data may be erased or lost. For non-volatile cache devices, the stored data is not lost if the power to the cache device is removed. In some embodiments, a cache device may store data to be directly accessed in any (e.g., random) order. Examples of cache devices include a random access memory (RAM), non-volatile RAM (NVRAM), dynamic RAM (DRAM), Magnetic Random Access Memory (MRAM), Phase Change RAM (PRAM), flash memory, etc. In other embodiments, other types of cache devices are used that are suitable for caching client data.

Storage system address: As used herein, a storage system address may comprise logical and/or physical address location information used by the storage system for uniquely identifying a data block on the storage devices. The storage system address for a data block may be used by the storage operating system to locate and access (read/write) the data block. A storage system address may be expressed in various forms. Examples of various storage system addresses include inode number, file block number (FBN), logical block number (LBN), logical block address (LBA), physical block number (PBN), etc. In other embodiments, other forms of storage system addresses may be used.

Cache address: As used herein, a cache address indicates a storage location in cache memory. For example, a cache address may indicate the storage location of a metadata header or a data block stored in cache memory.

Block identifier: As used herein, a block identifier may uniquely identify a data block. Examples of block identifiers include a storage system address or a cache address of the data block.

II. Storage System Environment

FIG. 1 is a block diagram of an exemplary storage system environment 100 in which some embodiments operate. The environment 100 may comprise a set of one or more server systems 110 (e.g., server systems 110a, 110b, etc.) connected to a set of one or more storage systems 120 (e.g., storage systems 120a, 120b, etc.) via a network 167. The server systems 110 may each access one or more storage systems 120 for storage services. The one or more storage systems 120 comprise a cluster storage system 135. Each storage system 120 in the cluster 135 may comprise a set of storage devices 130 (e.g., storage devices 130a, 130b, 130c, etc.) for storing client data, the storage devices 130 of the cluster 135 comprising a shared storage of the cluster storage system 135.

A server system 110 may comprise a computer system that may execute one or more applications 112 (e.g., applications 112a, 112b, etc.) that interacts with one or more storage systems 120 for sending read/write access requests to the one or more storage systems 120 and receiving requested data from the one or more storage systems 120 over the network 167. An application 112 may utilize the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. Examples of an application 112 include an email exchange application, database application, document processing application, etc. In other embodiments, an application 112 comprises a different type of application.

A storage system 120 may be coupled to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each application 112 executing on a server system 110 may utilize services of the cluster 135 to store and access its client data. The storage system 120 may comprise a computer system that stores client data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

In some embodiments, a server system 110 may host and implement/execute one or more cache devices 150 (e.g., cache devices 150a, 150b, 150c, etc.) for caching client data. In some embodiments, a storage system 110 may host and implement/execute one or more cache devices 150 (e.g., cache devices 150d, 150e, 150f, etc.) for caching client data.

In general, a cache device 150 may store data so that future read requests may be served faster. For example, the cache device 150 may store duplicates or copies of data stored on one or more storage devices 130. If a read request for data is received and if the requested data is stored in the cache device 150 (e.g., a cache hit), then the data may be transmitted from the cache device 150 instead of being transmitted from the storage device 130. As such, if the cache device 150 currently stores a copy of the data associated with the read request, then in response to the read request, the data may be retrieved and served from the cache device 150 instead of being retrieved and served from the storage device 130. Since a storage device 130 may have a slower response time than the cache device 150, serving the data from the cache device 150 instead of the storage device 130 may result in better overall performance and response time to the read request. If the requested data is not stored in the cache device 150 (e.g., a cache miss), then the data may be transmitted from the storage device 130.

In some embodiments, a cache device 150 may be shared by a plurality of storage devices 130. Each of the storage devices 130 may store a relatively large number of data blocks. For each storage device 130, the cache device 150 may store a copy of some data blocks stored on the storage device 130. In some embodiments, a data block stored on the cache device 150 may be a copy relative to a data block on each of a plurality of storage devices 130 (i.e., the data block stored on the cache device 150 may be a copy of a data block on a first storage device 130 as well as a data block on a second storage device 130). The data blocks stored on the cache device 150 that are copied from one or more storage devices 130 are referred to as "corresponding" data blocks for the storage devices 130. As such, a corresponding data block stored on the cache device 150 may be retrieved and served in response to a cache hit for each of a plurality of storage devices 130.

In particular, a storage system 120 may receive (from a server system) and process three types of access requests requiring input/output (I/O) operations from the storage system: a read request, a write request, and a metadata request. In a read request, the server system requests a block of data to be read from a storage device of the storage system. In a write request, the server system requests that a block of data to be written to a storage device of the storage system. In a metadata request, the server system requests other operations from the storage system (such as renaming a file, deleting a file, moving a file, etc.). These access requests are typically processed by the storage system by performing the I/O operations specified in access request and sending a reply back to the requesting server system.

When a cache device 150 is placed between the server system and the storage system, the I/O operations pass through the cache device and the cache device keeps a copy of the data retrieved from the storage system. Write and metadata requests are sent to the storage system and the cache device is updated to reflect the change. The data blocks stored on a cache device may be located through a "cache mapping table" that maps storage system addresses to cache addresses. A storage system address may comprise logical and/or physical address location information used by the storage system for uniquely identifying a data block on the storage devices 130. A cache address indicates a storage location in cache memory. As such, the cache device may process a received access request by using the cache mapping table to determine if a requested data block (specified by a storage system address) is currently stored in the cache device. With this design, an access request may be processed as follows: (1) the request is sent to the cache device, (2) the cache device forwards the request to the storage system, (3) the storage system processes the request and replies back to the cache device, (4) the cache device updates its stored data blocks and sends a reply back to the requesting server system.

Figure 2:
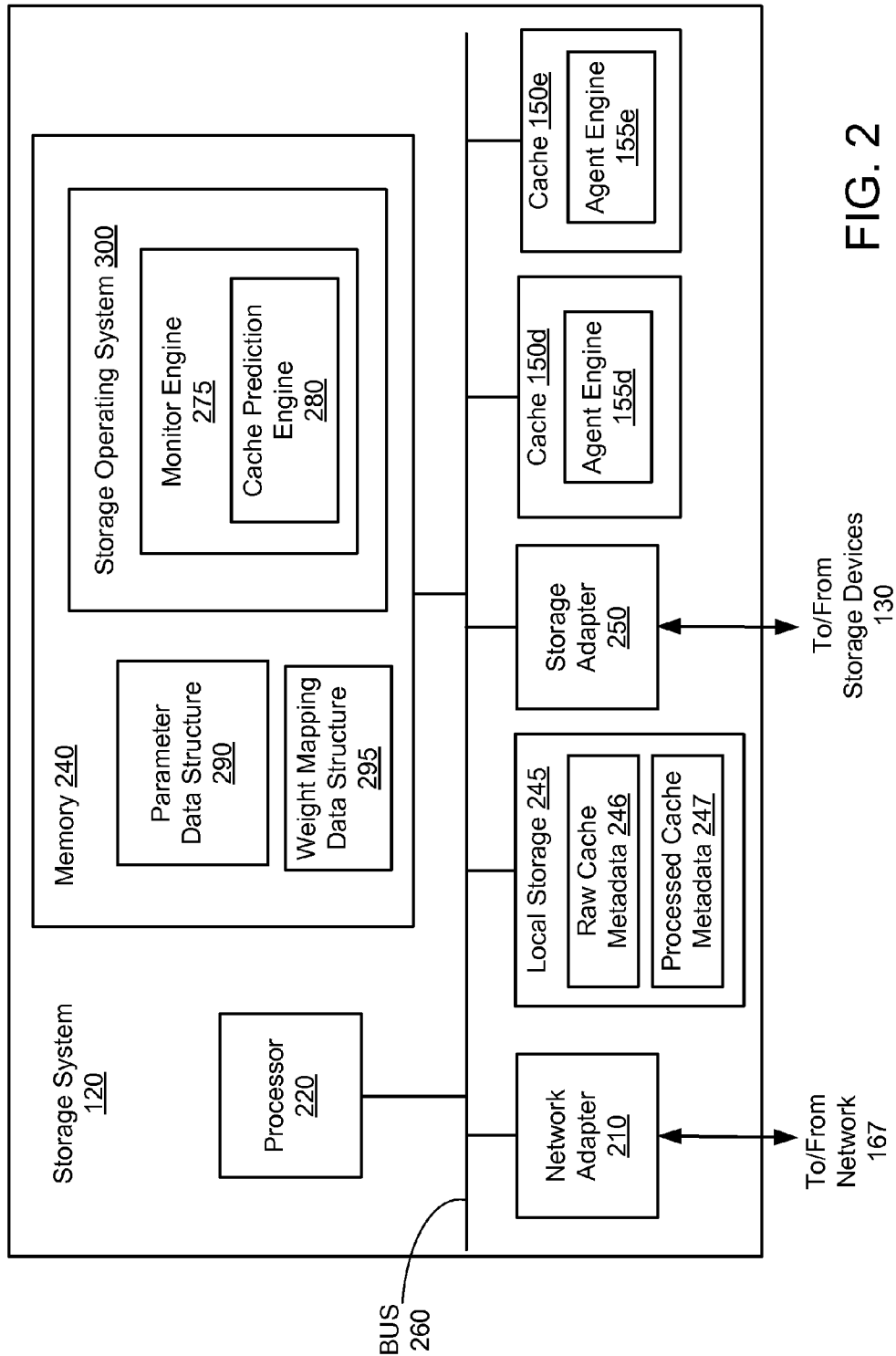
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, one or more processors 220, a memory 240, a local storage device 245, a storage adapter 250, and one or more cache devices 150 interconnected by a system bus 260. The network adapter 210 comprises the mechanical, electrical and signaling circuitry needed to connect the storage system 120 to a server system 110 over a computer network. The storage system may include one or more network adapters. Each network adapter 210 has a unique IP address and may provide one or more data access ports for server systems 110 to access the storage system 120 (where the network adapter accepts read/write access requests from the server systems 110 in the form of data packets). In some embodiments, the storage adapter 250 and the network adapter 210 may comprise a single unified target adapter (UTA) that may be used to perform the functionality of both the storage adapter 250 and the network adapter 210.

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a local storage device 245 for storing computer data, such as raw cache metadata 246 and processed cache metadata 247. A local storage device 245 may comprise a writable storage device media, such as disk device, video tape, optical, DVD, magnetic tape, and any other similar media adapted to store computer data.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a monitor engine 275) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300. As discussed herein, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

The storage adapter 250 cooperates with the storage operating system 300 executing on the storage system 120 to access data requested by the server system 110. The data may be stored on the storage devices 130 that are attached, via the storage adapter 250, to the storage system 120 or other node of a storage system as defined herein. The storage adapter 250 includes input/output (I/O) interface circuitry that couples to the storage devices 130 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 130 are combined into a single logical unit (i.e., RAID group). In a typical RAID group, storage devices 130 of the group share or replicate data among the disks that may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

In some embodiments, the memory 240 also stores a parameter data structure 290 and a weight mapping data structure 295 (described below). In some embodiments, the storage operating system 300 also comprises a monitor engine 275 that aggregates and processes cache metadata (described below). In other embodiments, the monitor engine 275 may be hosted and implemented on a server system 110 or a separate dedicated computer system. Note that a server system 110 may also comprise a computer system comprising computer hardware and software similar to the components of the storage system 120 and are not discussed in detail here. In some embodiments, each cache device 150 may host and implement/execute an agent engine 155 that collects and stores cache metadata (described below) for the cache device. In some embodiments, the monitor engine 275 comprises a cache prediction engine 280 for selecting data blocks for caching based on the processed cache metadata. In other embodiments, the cache prediction engine 280 may be external and separate from the monitor engine 275. In some embodiments, the monitor engine 275 and/or the agent engine 155 of each cache device 150 may use a dedicated processor (not shown) that executes monitor engine 275 and/or the agent engine 155. In other embodiments, the monitor engine 275 and/or the agent engine 155 of each cache device 150 may use the processor(s) 220 of the storage system that executes monitor engine 275 and/or the agent engine 155.

Figure 3:
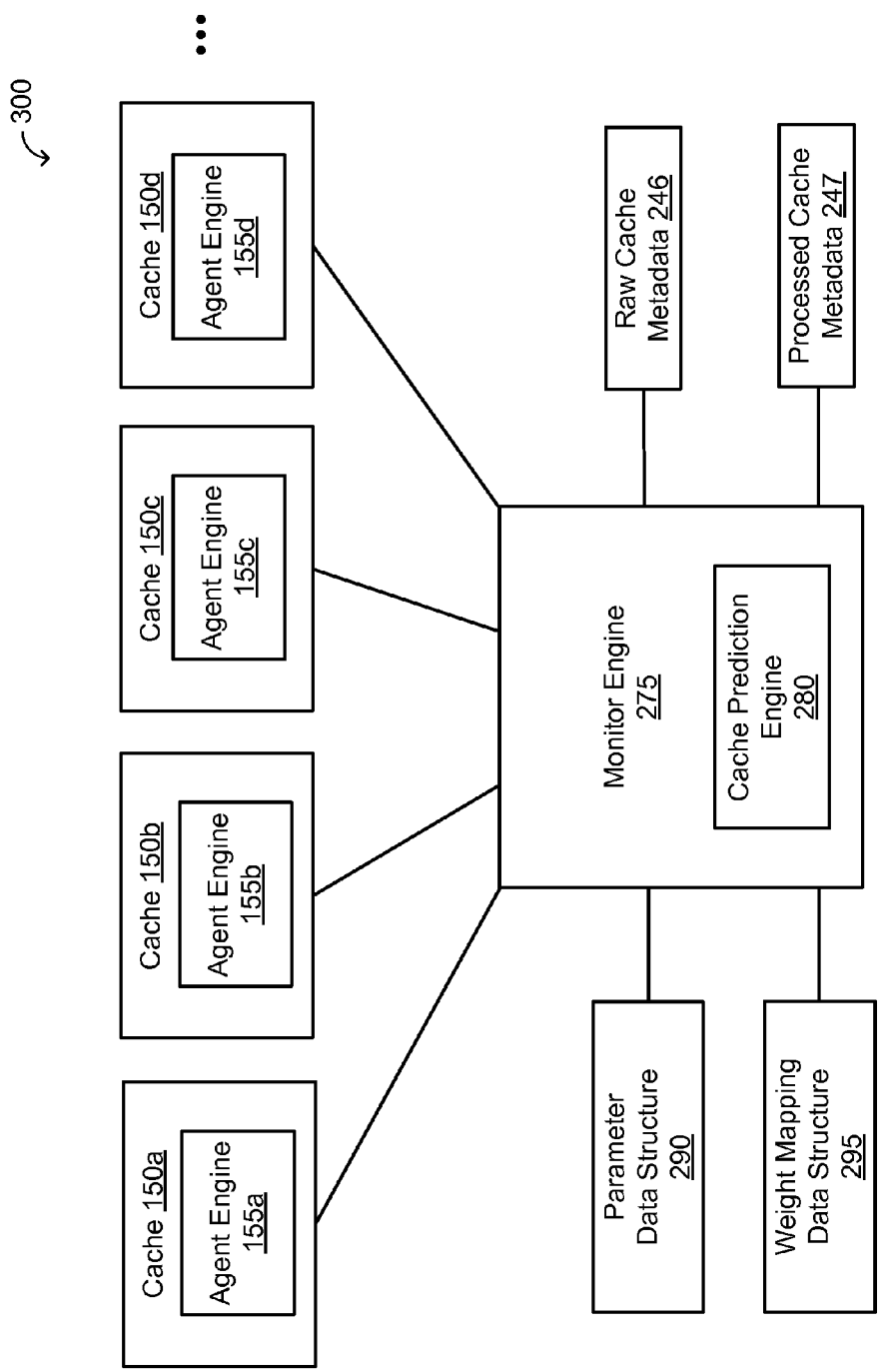
FIG. 3 is a conceptual diagram of a caching environment for processing cache metadata.

FIG. 3 is a conceptual diagram of a caching environment 300 for processing cache metadata. The caching environment 300 comprises a plurality of cache devices 150 (e.g., cache devices 150a, 150b, 150c, etc.) and the monitor engine 275. A cache device 150 may be hosted and executed on a server system 110, storage system 120, or any other suitable computer system. A cache device 150 may be coupled with the monitor engine 275 via a network (e.g., network 167) or a system bus (e.g., system bus 260). Each cache device 150 hosts and executes an agent engine 155 (e.g., agent engines 155a, 155b, 155c, etc.). The monitor engine 275 may be hosted and executed on a server system 110, storage system 120, or any other suitable computer system. To perform its cache processing functions, the monitor engine 275 may use a parameter data structure 290 and a weight mapping data structure 295. The monitor engine 275 may receive (from the cache devices 150) and store raw cache metadata 246 (e.g., to the local storage device 245). The monitor engine 275 may process the raw cache metadata 246 to produce and store processed cache metadata 247 (e.g., to the local storage device 245). The monitor engine 275 may comprise a cache prediction engine 280 for using the processed cache metadata 247 for selecting data blocks for caching.

The embodiments described herein provide a system and method for processing cache metadata from a plurality of cache devices. One or more storage systems may store data blocks to a set of storage devices, each storage system hosting and operating one or more cache devices for caching data blocks of the storage devices. Each cache device may host and execute an agent engine that collects and stores cache metadata for the cache device, the cache metadata describing caching operations and the caching of data blocks by the cache device. The monitor engine receives and aggregates "raw cache metadata" from each of a plurality of cache devices. The monitor engine processes the raw cache metadata in accordance with embodiments described herein to produce "processed cache metadata." The processed cache metadata is used by a cache prediction engine to select data blocks to be pre-loaded and stored to one or more of the cache devices (sometimes referred to herein as "cache warming"). Using the processed cache metadata, the cache prediction engine may make better informed determinations and select more desirable data blocks than if using raw cache metadata to select one or more data blocks for caching.

In some embodiments, there are three stages/steps for processing cache metadata. In a first stage, the agent engine of each cache device collects and stores cache metadata describing the caching operations of the cache device. In a second stage, the agent engine of each cache device transmits/sends the collected raw cache metadata to the monitor engine. In a third state, the monitor engine aggregates and processes the raw cache metadata to produce processed cache metadata that is used by the cache prediction engine to select one or more data blocks for caching.

Figure 4:
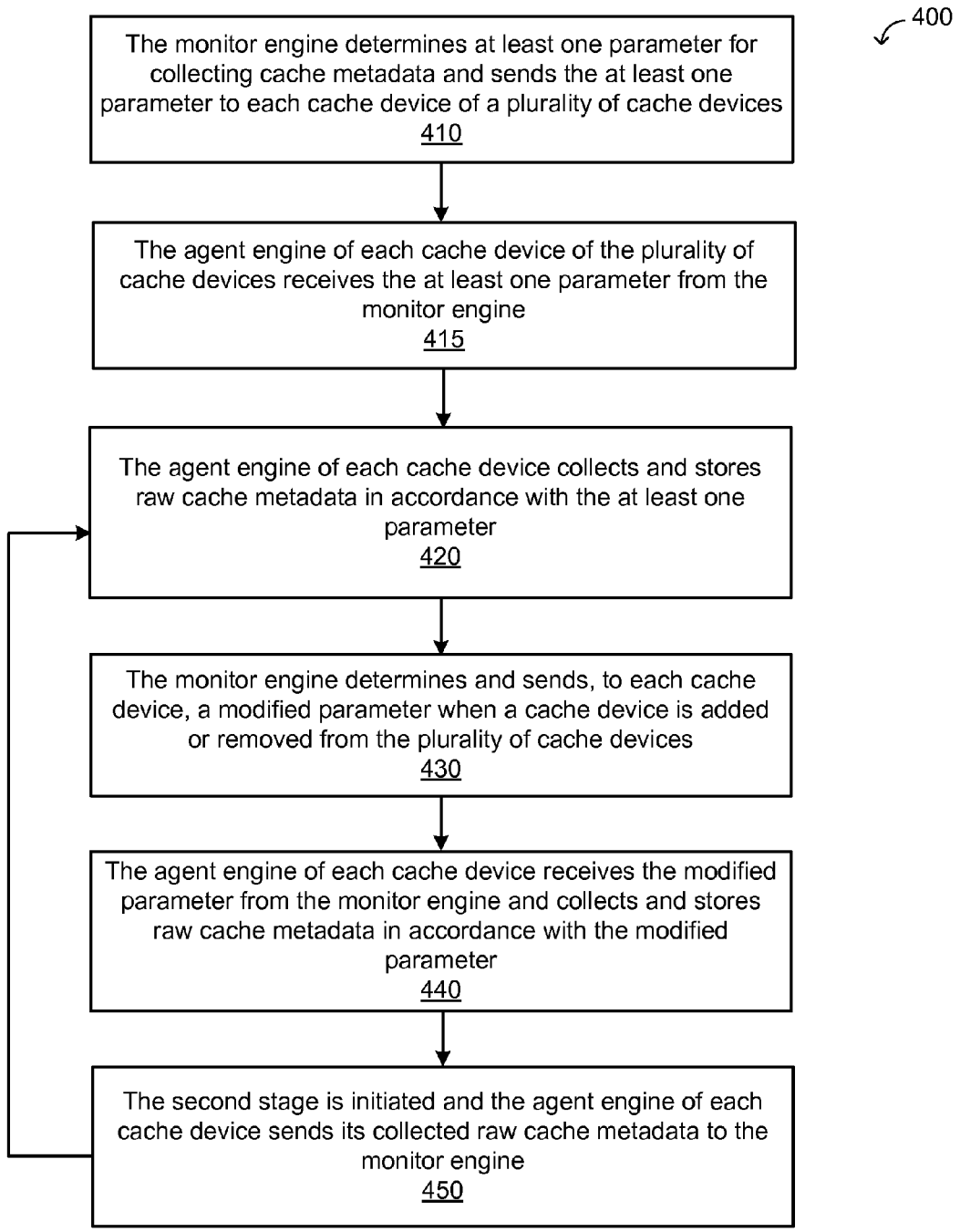
FIG. 4 is a flowchart of a technique for collecting and transmitting raw cache metadata in accordance with some embodiments.

III. First and Second Stages for Collecting and Transmitting Raw Cache Metadata FIG. 4 is a flowchart of a technique 400 for collecting and transmitting raw cache metadata in accordance with some embodiments. In some embodiments, some of the steps of technique 400 are performed or caused to be performed by the monitor engine 275 and the agent engine 155 of each cache device 150 which are configured to perform steps of the technique 400. The monitor engine 275 and agent engines 155 may be configured to operate in conjunction with other software modules of the storage system 120, server system 110, and software modules of the storage operating system 300 to collectively perform the embodiments described herein. The order and number of steps of the technique 400 are for illustrative purposes only and, in other embodiments, a different order and/or number of steps are used. The technique 400 is described in relation to FIG. 3 which conceptually illustrates the steps of the technique 400.

The technique 400 begins by the monitor engine 275 determining (at step 410) at least one parameter for collecting cache metadata and sending/transmitting the at least one parameter to each cache device of a plurality of cache devices. The at least one parameter may comprise any variety of parameters relating to collection of cache metadata and may specify, for example, the type of cache metadata to collect and the manner or method for each cache device to collect it. Examples of the at least one parameter include a total number of cache accesses, list of most popular data blocks and number of accesses, I/O rate, support threshold, sample time, error rate, etc. In other embodiments, other parameters are used. In some embodiments, the monitor engine 275 may receive the at least one parameter from a user/administrator. The monitor engine 275 may store the one or more determined parameters to the parameter data structure 290. In this manner, the monitor engine may control and direct the agent engines in the collection of cache metadata by specifying parameters for which cache metadata to collect and how to collect it.

In some embodiments, the at least one parameter specifies that a cache device collect cache metadata that includes a total number of cache accesses of the cache device during a predetermined time period (referred to as the "collecting time period"). In some embodiments, the collecting time period spans from the last point in time the second stage was initiated to a current point in time when the second stage is currently initiated. In other embodiments, the collecting time period may be specified by a sample time parameter. The total number of cache accesses may indicate a total number of times/occurrences during the collecting time period that the cache device accessed its cached data blocks in response to received access requests (e.g., read/write requests). In some embodiments, the total number of accesses may comprise the combined total number of read and write accesses in response to read and write requests. In some embodiments, the at least one parameter may specify that a total number of read accesses and/or a total number of write accesses be individually collected and recorded as separate values. The total number of cache accesses of a cache device indicates the activity rate or level of access activity for the cache device.

In some embodiments, the at least one parameter specifies to collect cache metadata that includes a list of the X most popular data blocks and number of accesses for each such popular data block of the cache device during the collecting time period, X being an integer value. In these embodiments, the at least one parameter may specify that the X top data blocks having the most accesses be recorded, and the number of accesses for each such data block be recorded by each cache device. In some embodiments, each data block may be identified by a block identifier that uniquely identifies the data block. Examples of block identifiers include a storage system address or a cache address of the data block. In these embodiments, the list of the X most popular data blocks may comprise a list of block identifiers for the X most popular data blocks. In some embodiments, the at least one parameter may specify that the number of accesses to be recorded for each popular data block comprise a number of read and write accesses, a number of read accesses only, or a number of write accesses only for the popular data block.

In some embodiments, the at least one parameter specifies that a cache device collect cache metadata that includes an input/output (I/O) rate of the cache device during the collecting time period. The I/O rate indicates the rate of input and output operations and read and write operations of the cache device in response to received access requests. As such, in some embodiments, the I/O rate indicates of a cache device may be used to indicate the activity rate or level of access activity for the cache device. In some embodiments, the at least one parameter may specify that the I/O rate comprises the I/O rate for read and write accesses (total I/O rate), the I/O rate for read accesses only (read I/O rate), or the I/O rate for write accesses only (write I/O rate) for the cache device.

In some embodiments, the at least one parameter specifies a support threshold value to be used for collecting cache metadata. The support threshold value may specify a minimum number of accesses that is required for a cached data block before the block identifier for the cached data block and its number of accesses is reported/transmitted to the monitor engine. As a large number of cached data blocks for a cache device may each experience one or so accesses during the collecting time period, the support threshold value may significantly reduce the amount of cache metadata communicated between the cache device and the monitor engine and include only cache metadata for those data blocks that receive a minimum number of accesses.

In some embodiments, the at least one parameter specifies a sample time value to be used for collecting cache metadata. The sample time value may specify the collecting time period for collecting the cache metadata for each cache device. The sample time value reflects the window size or data stream size of the cache metadata for each cache device.

In some embodiments, the at least one parameter may be determined based, at least in part, on the number of cache devices in the plurality of cache devices. For example, the at least one parameter may comprise a cache device maximum error rate for the cache metadata. A cache device maximum error rate signifies how accurate the agent engine executing on the cache device is required to be for collecting the cache metadata. For example a 5% maximum error rate may indicate that the collected and reported cache metadata values are less than the true cache metadata values by at most 5%. The agent engine may implement a cache metadata collecting algorithm that may vary in its error rate depending on the collection overhead to be incurred. A higher maximum allowed error rate will typically incur a lower collection overhead for the collecting algorithm. An aggregated maximum error rate may comprise the combined maximum error rate allowed for all the cache metadata received by the monitor engine from the plurality of cache devices. For example, the aggregated maximum error rate may be received by the monitor engine from a user/administrator. The monitor engine may then determine the cache device maximum error rate based on the aggregated maximum error rate and the number of cache devices in the plurality of cache devices. For example, if the aggregated maximum error rate is 5% and there are two cache devices in the plurality of cache devices, the monitor engine may determine the cache device maximum error rate is 2.5% (whereby using joint probability calculations: (0.5)(0.5)=(0.25)).

At step 415, the agent engine 155 of each cache device 150 of the plurality of cache devices receives the at least one parameter from the monitor engine 275. At step 420, the agent engine 155 of each cache device 150 collects and stores cache metadata in accordance with the at least one parameter. The cache metadata collected by the agent engine is referred to as raw cache metadata. Each agent engine may implement various cache metadata collecting algorithms known in the art for collecting cache metadata in accordance with the at least one parameter. For example, for counting number of accesses for its cached data blocks, the agent engine may implement algorithms such as lossy counting, count-minimum, sliding window counting, or the like. Each agent engine may implement any cache metadata collecting algorithms that provides for the minimal level of requirements specified by the at least one parameter.

At step 430, the monitor engine 275 determines and sends, to each cache device, a modified parameter of the at least one parameter. The monitor engine 275 may determine a modified parameter if a cache device is added or removed from the plurality of cache devices. Since one or more parameters may be determined based, at least in part, on the number of cache devices in the plurality of cache devices, if the number of cache devices changes, the parameter may be modified, and the modified parameter sent to the cache devices. For example, the monitor engine 275 may send a modified cache device maximum error rate to each cache device is a cache device is added or removed from the plurality of cache devices. At step 440, the agent engine 155 of each cache device 150 receives the modified parameter from the monitor engine 275 and collects and stores cache metadata in accordance with the modified parameter.

At step 450, the second stage is initiated and the agent engine 155 of each cache device 155 transmits/sends its collected raw cache metadata to the monitor engine 275. The collected raw cache metadata of each cache device may be transmitted to the monitor engine via a network or internal bus. In some embodiments, the cache metadata of each cache device 155 may also include the storage system ID of the storage system 120 that hosts and implements the cache device 155. The second stage may be initiated at regular predetermined time intervals. In some embodiments, the cache metadata collected by each cache device since the last time the second stage was initiated is sent to the monitor engine. As such, the cache metadata for a cache device that is received by the monitor engine comprises the cache metadata collected by the cache device during a predetermined time period (referred to as the "collecting time period"). In some embodiments, the collecting time period spans from the last point in time the second stage was initiated to a current point in time when the second stage is currently initiated. In other embodiments, the collecting time period may be specified by a sample time parameter.

In some embodiments, the second stage may be implemented using a push model, pull model, or hybrid model. In the push model, each agent engine 155 sends the raw cache metadata to the monitor engine 275 at predetermined time intervals without receiving a request for the raw cache metadata from the monitor engine 275. In the pull model, each agent engine 155 sends the raw cache metadata to the monitor engine 275 at predetermined time intervals only after receiving a request for the raw cache metadata from the monitor engine 275. In the hybrid model, the push or pull model may be used at different times depending on the situation.

The technique 400 then continues at step 420 where the agent engine 155 of each cache device 150 continues to collect and store raw cache metadata in accordance with the at least one parameter.

IV. Third Stage for Aggregating and Producing Processed Cache Metadata

Figure 5:
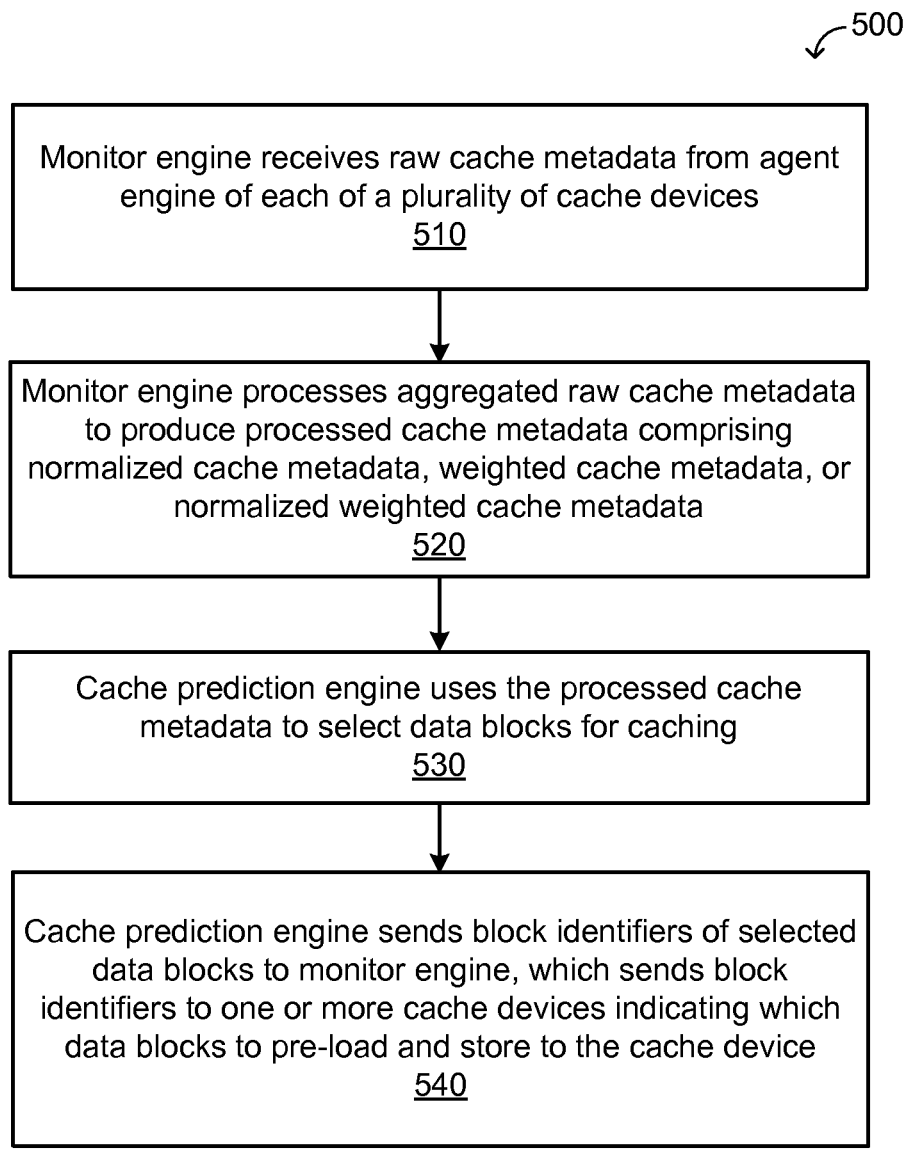
FIG. 5 is a flowchart of a technique for aggregating raw cache metadata and producing processed cache metadata in accordance with some embodiments.

FIG. 5 is a flowchart of a technique 500 for aggregating raw cache metadata and producing processed cache metadata in accordance with some embodiments. In some embodiments, some of the steps of technique 400 are performed or caused to be performed by the monitor engine 275 which is configured to perform steps of the technique 500. The monitor engine 275 may be configured to operate in conjunction with other software modules of the storage system 120, server system 110, and software modules of the storage operating system 300 to collectively perform the embodiments described herein. The order and number of steps of the technique 500 are for illustrative purposes only and, in other embodiments, a different order and/or number of steps are used.

The technique 500 begins by the monitor engine 275 receiving (at step 510) raw cache metadata from an agent engine 155 of each cache device 150 of a plurality of cache devices and storing the aggregated raw cache metadata 246 (e.g., to local storage device 245). Cache metadata received from a cache device 150 may describe caching operations and the caching of data blocks by the cache device 150. In some embodiments, the cache metadata of each cache device 155 may also include the storage system ID of the storage system 120 that hosts and implements the cache device 155. In some embodiments, the cache metadata received from a cache device 150 may comprise a total number of cache accesses during the collecting time period, a list of the X most popular data blocks and number of accesses for each popular data block during the collecting time period, and/or the I/O rate of the cache device during the collecting time period. In other embodiments, the cache metadata received from a cache device 150 may comprise other cache metadata.

The total number of cache accesses may comprise the total number of read and write accesses, total number of read accesses only, and/or the total number of write accesses only during the collecting time period. The list of the X most popular data blocks may comprise a list of block identifiers for the X most popular data blocks that meet the support threshold value for minimum number of required accesses. The list may also include the number of read and write accesses for each popular data block, the number of read accesses only for each popular data block, and/or the number of write accesses only for each popular data block during the collecting time period. The I/O rate may comprise the read and write accesses (total I/O rate), the I/O rate for read accesses only (read I/O rate), and/or the I/O rate for write accesses only (write I/O rate) for the cache device during the collecting time period.

Figure 6:
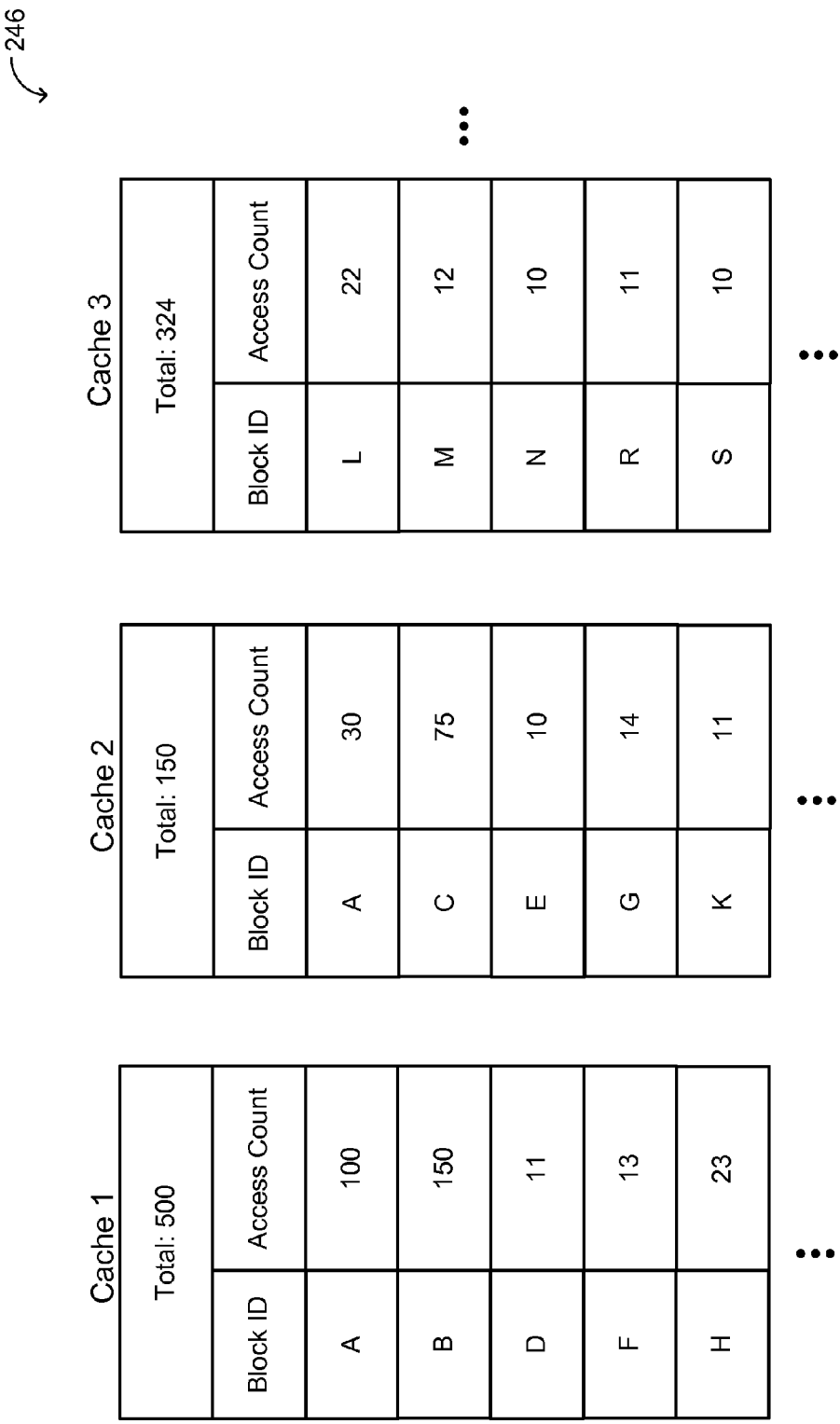
FIG. 6 shows a conceptual diagram of exemplary aggregated raw cache metadata received by the monitor engine from a plurality of cache devices.

FIG. 6 shows a conceptual diagram of exemplary aggregated raw cache metadata 246 received by the monitor engine from a plurality of cache devices. In the example of FIG. 6, the raw cache metadata 246 comprises a total number of read accesses for each cache device and a list of block identifiers of the X most popular data blocks and the number of read accesses for each such popular data block. As shown in FIG. 6, the aggregated raw cache metadata 246 comprises raw cache metadata 246 from a plurality of cache devices, such as "Cache 1," "Cache 2," "Cache 3," etc. In the example of FIG. 6, the raw cache metadata of Cache 1 indicates that Cache 1 has a total number of 500 read accesses, block A having 100 read accesses, block B having 150 read accesses, etc. Also, the raw cache metadata of Cache 2 indicates that Cache 2 has a total number of 150 read accesses, block A having 30 read accesses, block C having 75 read accesses, etc. Further, the raw cache metadata of Cache 3 indicates that Cache 3 has a total number of 324 read accesses, block L having 22 read accesses, block M having 10 read accesses, etc.

At step 520, the monitor engine 275 processes the aggregated raw cache metadata to produce processed cache metadata 247 and stores the processed cache metadata 247 (e.g., to local storage device 245). Depending on the implementation, the processed cache metadata may comprise normalized cache metadata, weighted cache metadata, or normalized weighted cache metadata.

In some embodiments, at step 520, the monitor engine 275 may normalize/standardize the raw cache metadata to produce normalized cache metadata. The monitor engine does so by normalizing/standardizing the raw cache metadata from each cache device based on an activity rate of the cache device. The activity rate of a cache device indicates a level of access activity for the cache device. In some embodiments, the activity rate of a cache device is indicated by a total number of cache accesses for the cache device during the collecting time period. In some embodiments, normalizing the cache metadata of a cache device may comprise, for each cached data block that is reported, dividing the individual number of block accesses for the cached data block by the total number of cache accesses for the cache device.

In other embodiments, the activity rate of a cache device may be indicated by other cache metadata which is used to normalize the cache metadata. The activity rate or total number of cache accesses of a cache device may be derived by such other cache metadata and used to normalize the cache metadata. For example, the activity rate may be indicated by the I/O rate of the cache device and used to normalize the cache metadata, or the total number of cache accesses may be derived from the I/O rate and used to normalize the cache metadata. As such, in other embodiments, any parameter or measurement in the cache metadata received from a cache device that indicates or relates to the activity rate of the cache device may be used to normalize the cache metadata.

Generally a cache prediction engine may select data blocks for caching based on the "popularity" of the data block, which may be indicated by raw cache metadata comprising the number of accesses for multiple data blocks for a predetermined time period. However, relying only on the raw number of accesses for the data blocks may produce skewed results when the cache prediction engine uses cache metadata from different cache devices having different levels of activity. For example, if there is a first cache device that is much more active than a second cache device, the number of block accesses for the data blocks cached by the first cache device will generally be much higher than the number of block accesses for the data blocks cached by the second cache device by the mere fact that the first cache device is much more active. As such, the cache metadata from the first cache device will skew and dominate the number of block accesses for the cached data blocks. By normalizing the cache metadata from each cache device based on an activity rate of the cache device, the cache metadata from a highly active cache device will not skew the cache metadata for particular cached data blocks and a more accurate view of which data blocks are actually the most popular can be achieved.

Using the example shown in FIG. 6 of the raw cache metadata 246 received from first and second cache devices, the first cache device ("Cache 1") has a total number of 500 cache accesses, whereby data block A had 100 read accesses and data block B had 150 read accesses during the collecting time period. The second cache device ("Cache 2") had a total number of 150 cache accesses, whereby data block A had 30 read accesses and data block C had 75 read accesses during the collecting time period. If the cache metadata is not normalized for the two cache devices, then it would be determined that data block B is most popular with a total of 150 block accesses, followed by data block A with a total of 130 block accesses, and then lastly data block C with a total of 75 block accesses across the two cache devices. A cache prediction engine using this raw cache metadata to select data blocks may then likely choose data block B for cache warming.

Normalizing the cache metadata of the first cache device ("Cache 1"), however, may comprise dividing the 100 read accesses for data block A and the 150 read accesses for data block B by the total number of 500 cache accesses for the first cache device to produce a normalized value of 0.2 (100/500) for data block A and a normalized value of 0.3 (150/500) for data block B. Normalizing the cache metadata of the second cache device ("Cache 2") may comprise dividing the 30 read accesses for data block A and the 75 read accesses for data block C by the total number of 150 cache accesses for the second cache device to produce a normalized value of 0.2 (30/150) for data block A and a normalized value of 0.5 (75/150) for data block C. For multiple cache devices, the normalized cache metadata for the cache devices can then be combined. For the two cache devices, the combined normalized cache metadata for the number of block accesses for data block A is 0.4 (0.2+0.2), for data block B is 0.3, and for data block C is 0.5. As such, the normalized cache metadata indicates that block C is the most popular, followed by block A, then by block B. A cache prediction engine using this normalized cache metadata to select data blocks may then likely choose data block C for cache warming.

FIG. 7 shows a conceptual diagram of exemplary processed cache metadata 247 comprising normalized cache metadata produced by the monitor engine 275 using the aggregated raw cache metadata 246 of FIG. 6. As shown in the example of FIG. 7, the normalized cache metadata comprises a block identifier for each data block reported in the aggregated raw cache metadata 246 of FIG. 6, and a single normalized access count for each block identifier. In some embodiments, multiple access counts for the same block identifier in the aggregated raw cache metadata 246 may be combined to produce a single normalized access count. For example, the combined normalized cache metadata for the number of block accesses for data block A is 0.4 (0.2+0.2). As such, the normalized cache metadata requires less data storage than the aggregated raw cache metadata 246 of FIG. 6.

In other embodiments, at step 520, the monitor engine 275 may weight the raw cache metadata to produce weighted cache metadata. In these embodiments, each storage system in a plurality of storage systems is assigned and associated with a weight value. The weight value for each storage system may be determined, for example, by an administrator. For example, the weight value of a storage system may indicate a level of importance of the storage system relative to the other storage systems. For example, a particular storage system may be typically accessed by high priority users (such as administrators, users paying a fee, etc.). Such a storage system may be assigned a higher weight value than a storage system that is not typically accessed by high priority users.

As another example, the weight value of a storage system may indicate a desired performance level of the storage system relative to the other storage systems. For example, a particular storage system may have a higher service level objective (SLO) relative to other storage systems, and thus is expected to perform at a higher level than other storage systems. Each workload may have zero or more specified service-level objectives (SLOs). An SLO of a storage system may specify a minimum or maximum target value/threshold of a performance metric to be achieved by the storage system when servicing a workload. A non-exhaustive list of examples of performance metrics include data throughput, data latency, processor utilization, storage device utilization, input/output operations per second (IOPS) for storage devices, etc. As such, a storage system expected to perform at a higher level may be assigned a higher weight value than a storage system that is expected to perform at a lower level.

In these embodiments, the weight value assigned for a storage system is also the weight value assigned for each cache device that is hosted on the storage system. In these embodiments, each storage system in a plurality of storage systems is assigned and associated with a unique storage system identifier (ID). The cache metadata of each cache device may include the storage system ID of the storage system that hosts and implements the cache device. Upon receiving the cache metadata from a cache device, the monitor engine may access a weight mapping data structure 295 that maps storage system IDs to their corresponding weight values.

FIG. 8 shows a conceptual diagram of an exemplary weight mapping data structure 295 used in some embodiments. The weight mapping data structure 295 stores a plurality of storage system identifiers (IDs) for a plurality of different storage systems, each storage system and storage system ID having an assigned corresponding weight value. In some embodiments, the weight values range from 0.0 to 1.0. In other embodiments, another range of values may be used for the weight values. As shown in the example of FIG. 8, different storage systems and storage system IDs may have different assigned weight values. For example, storage system 1 is assigned a weight value of 0.8, storage system 2 is assigned a weight value of 1.0, storage system 3 is assigned a weight value of 0.5, etc. The weight value for assigned for each storage system in the weight mapping data structure 295 may be determined, for example, by an administrator.

After determining the weight value for a cache device using the weight mapping data structure 295, the monitor engine 275 may then apply the weight value to the raw cache metadata for the cache device to produce weighted cache metadata. For example, the monitor engine 275 may multiple values in the raw cache metadata with the weight value to produce weighted cache metadata. FIG. 9 shows a conceptual diagram of exemplary processed cache metadata 247 comprising weighted cache metadata produced by the monitor engine 275 using the aggregated raw cache metadata 246 of FIG. 6.

In the example of FIG. 9, Cache 1 is hosted on storage system 1, Cache 2 is hosted on storage system 2, and Cache 3 is hosted on storage system 3. Accordingly, the cache metadata received from Cache 1 includes a storage system ID that indicates Cache 1 is hosted on storage system 1, and thus is assigned a weight value of 0.8, the cache metadata received from Cache 2 includes a storage system ID that indicates Cache 2 is hosted on storage system 2, and thus is assigned a weight value of 1.0, and the cache metadata received from Cache 3 includes a storage system ID that indicates Cache 3 is hosted on storage system 3, and thus is assigned a weight value of 0.5. As shown in the example of FIG. 9, for the cache metadata of Cache 1, the weight value of 0.8 is applied to the access count of each data block to produce a weighted access count for each data block. For the cache metadata of Cache 2, the weight value of 1.0 is applied to the access count of each data block to produce a weighted access count for each data block, and so forth.

In other embodiments, at step 520, the monitor engine 275 may also normalize the weighted cache metadata to produce normalized weighted cache metadata. In some embodiments, after producing the weighted cache metadata for a cache device, the monitor engine 275 may normalize the weighted cache metadata based in part on the activity rate of the cache device to produce normalized weighted cache metadata. In other embodiments, after producing the normalized cache metadata for a cache device, the monitor engine 275 may weight the normalized cache metadata of the cache device to produce normalized weighted cache metadata.

FIG. 10 shows a conceptual diagram of exemplary processed cache metadata 247 comprising normalized weighted cache metadata produced by the monitor engine 275 using the weighted cache metadata of FIG. 9. As shown in the example of FIG. 10, the normalized weighted cache metadata comprises a block identifier for each data block reported in the weighted cache metadata of FIG. 9, and a single normalized weighted access count for each block identifier. In these embodiments, the weighted access count of a data block is normalized by the total number of accesses for the cache device. For example, for block A in Cache 1, the weighted access count of 80 is divided by the 500 total number of accesses for Cache 1, thereby giving a normalized weighted value of 0.16. For block A in Cache 2, the weighted access count of 30 is divided by the 150 total number of accesses for Cache 2, thereby giving a normalized weighted value of 0.2. In some embodiments, multiple access counts for the same block identifier in the weighted cache metadata may be combined to produce a single normalized weighted access count. For example, the combined normalized weighted cache metadata for the number of block accesses for data block A is 0.36 (0.16+0.2).

At step 530, the processed cache metadata produced by the monitor engine 275 (at step 520) is used by a cache prediction engine 280 for selecting data blocks for caching based on the processed cache metadata. The cache prediction engine may implement any cache prediction algorithm known in the art, such as Bélády's algorithm, Least Recently Used (LRU) algorithm, Most Recently Used (MRU) algorithm, etc. The cache prediction engine may be part of the monitor engine, or be a separate external component that communicates with the monitor engine. Using the processed cache metadata, the cache prediction engine may select more desirable data blocks than if using the raw cache metadata. As such, the cache prediction engine selects one or more data blocks for caching in one or more cache devices based, at least in part, on the processed cache metadata of a plurality of cache devices. This processed cache metadata may comprise normalized cache metadata, weighted cache metadata, or normalized weighted cache metadata depending on the implementation.

At step 540, the cache prediction engine 280 sends block identifiers for one or more selected data blocks to the monitor engine 275, which in turn sends the block identifiers for the one or more selected data blocks to one or more cache devices 150 indicating which data blocks to pre-load and store to the cache device (cache warming). In some embodiments, the block identifiers for the selected data blocks are sent to all the cache devices so that all the cache devices then pre-load and store the selected data blocks. In other embodiments, the identifiers for the selected data blocks are only sent to some of the cache devices so that only some of the cache devices pre-load and store the selected data blocks. In some embodiments, for each selected data block, a cache device may perform a direct read of the selected data block from a storage device and then load and store the selected data block. In other embodiments, the storage system hosting the cache device may perform a conventional read operation of each selected data block from one or more storage devices, which then indirectly causes the data blocks to be loaded into the cache device. The technique 500 then ends.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system comprising:
a processor; and
memory operatively coupled to the processor, the memory storing one or more engines configured for execution by the processor, the one or more engines including a monitor engine that when executed, by the processor is operable to:
receive cache metadata from a plurality of cache devices, each cache device configured for caching a plurality of data blocks for a set of storage devices that store the plurality of data blocks, the cache metadata for the cache device describing caching of the plurality of data blocks by the cache device;
normalize the cache metadata of the cache device by dividing a number of block accesses directed to a data block of the plurality of data blocks cached at the cache device by a number of cache accesses for the cache device to produce normalized cached metadata; and
select the data block for caching based on the normalized cache metadata of the cache device.

2. The system of claim 1, wherein an activity rate of the cache device is indicated by the number of cache accesses for the cache device during a predetermined time period.

3. The system of claim 2, wherein the cache metadata specifies the number of block accesses for the selected data block cached by the cache device.

4. The system of claim 2, wherein:
the plurality of cache devices include a first cache device and a second cache device, the first cache device associated with a first cache metadata, and the second cache device associated with a second cache metadata,
the first cache metadata from the first cache device is a first number of block accesses for a first data block cached by the first cache device,
the second cache metadata from the second cache device is a second number of block accesses for the first data block cached by the second cache device, and
wherein the monitor engine when executed to normalize the cache metadata is further operable to:
normalize the first cache metadata and the second cache metadata by:
(i) dividing the first number of block accesses by a first number of cache accesses for the first cache device to produce a first normalized number of block accesses,
(ii) dividing the second number of block accesses by a second number of cache accesses for the second cache device to produce a second normalized number of block accesses, and
(iii) adding the first normalized number of block accesses and the second normalized number of block accesses to produce the normalized cache metadata for the first data block.

5. The system of claim 2, wherein the number of cache accesses comprises a number of read accesses and write accesses, a number of read accesses only, or a number of write accesses only for the cache device during the predetermined time period.

6. The system of claim 1, wherein the monitor engine, when executed is further operable to:
send, to the cache device, at least one parameter for collecting the cache metadata, wherein the at least one parameter is determined based, at least in part, on a number of cache devices in the plurality of cache devices.

7. The system of claim 6, wherein the at least one parameter is modified if a selected cache device is added or removed from the plurality of cache devices.

8. A non-transitory computer readable storage medium containing executable program instructions for execution on a processor and configured to be stored on the non-transitory computer readable storage medium, the program instructions when executed operable to:
receive cache metadata from a plurality of cache devices, each cache device configured to cache a plurality of data blocks for a set of storage devices that store the plurality of data blocks, the cache metadata for the cache device describing caching of the cache device;
normalize the cache metadata of the cache device by dividing a number of block accesses for a data block of the plurality of data blocks cached at the cache device by a number of cache accesses for the cache device to produce normalized cache metadata; and select the data block for caching based on the normalized cache metadata of the cache device.

9. The non-transitory computer readable medium of claim 8, wherein an activity rate of the cache device is indicated by the number of cache accesses for the cache device during a predetermined time period.

10. The non-transitory computer readable medium of claim 9, wherein the cache metadata from the cache device specifies the number of block accesses for the selected data block cached by the cache device.

11. The non-transitory computer readable medium of claim 9, wherein
the plurality of cache devices includes a first cache device and a second cache device, the first cache device associated with a first cache metadata, and the second cache device associated with a second cache metadata,
the first cache metadata from the first cache device is a first number of block accesses for a first data block cached by the first cache device,
the second cache metadata from the second cache device is a second number of block accesses for the first data block cached by the second cache device; and
wherein the program instructions when executed to normalize the cache metadata are further operable to:
normalize the first cache metadata and the second cache metadata by:
dividing the first number of block accesses by a first number of cache accesses for the first cache device to produce a first normalized number of block accesses,
dividing the second number of block accesses by a second number of cache accesses for the second cache device to produce a second normalized number of block accesses, and
adding the first normalized number of block accesses and the second normalized number of block accesses to produce the normalized cache metadata for the first data block.

12. The non-transitory computer readable medium of claim 9, wherein the number of cache accesses comprises a number of read accesses and write accesses, a number of read accesses only, or a number of write accesses only for the cache device during the predetermined time period.

13. The non-transitory computer readable medium of claim 8, wherein the program instructions, when executed by the processor, are further operable to:
send, to the cache device, at least one parameter for collecting the cache metadata, wherein the at least one parameter is determined based, at least in part, on a number of cache devices in the plurality of cache devices.

14. The non-transitory computer readable medium of claim 13, wherein the at least one parameter is modified if a selected cache device is added or removed from the plurality of cache devices.

15. A computer-implemented method comprising:
receiving cache metadata from a plurality of cache devices, each cache device configured to cache a plurality of data blocks for a set of storage devices that store the plurality of data blocks, the cache metadata for the cache device describing caching of the plurality of data blocks by the cache device;
normalizing, by a processor of a computer, the cache metadata of the cache device by dividing a number of block accesses for a data block of the plurality of data blocks cached at the cache device by a number of cache accesses for the cache device to produce normalized cache metadata; and
selecting the data block for caching based on the normalized cache metadata.

16. The computer-implemented method of claim 15, wherein an activity rate of the cache device is indicated by the number of cache accesses for the cache device during a predetermined time period.

17. The computer-implemented method of claim 16, wherein the cache metadata from the cache device specifies the number of block accesses for the selected data block cached by the cache device.

18. The computer-implemented method of claim 15, wherein
the plurality of cache devices includes a first cache device and a second cache device, the first cache device associated with a first cache metadata, and the second cache device associated with a second cache metadata;
the first cache metadata from the first cache device is a first number of block accesses for a first data block cached by the first cache device;
the second cache metadata from the second cache device is a second number of block accesses for the first data block cached by the second cache device; and
wherein normalizing the cache metadata further comprises:
normalizing the first cache metadata and the second cache metadata by:
dividing the first number of block accesses by a first number of cache accesses for the first cache device to produce a first normalized number of block accesses;
dividing the second number of block accesses by a second number of cache accesses for the second cache device to produce a second normalized number of block accesses; and
adding the first normalized number of block accesses and the second normalized number of block accesses to produce the normalized cache metadata for the first data block.

19. The computer-implemented method of claim 16, wherein the number of cache accesses comprises a number of read accesses and write accesses, a number of read accesses only, or a number of write accesses only for the cache device during the predetermined time period.

20. The computer-implemented method of claim 15, further comprising:
sending, to the cache device, at least one parameter for collecting the cache metadata, wherein the at least one parameter is determined based, at least in part, on a number of cache devices in the plurality of cache devices.

21. The computer-implemented method of claim 20, wherein the at least one parameter is modified if a selected cache device is added or removed from the plurality of cache devices.

* * * * *